US011859787B1

(12) United States Patent
Shih

(10) Patent No.: US 11,859,787 B1
(45) Date of Patent: Jan. 2, 2024

(54) ADAPTIVE HEADLAMP DEVICE

(71) Applicant: T.Y.C. BROTHER INDUSTRIAL CO., LTD., Tainan (TW)

(72) Inventor: Ming-Chih Shih, Tainan (TW)

(73) Assignee: T.Y.C. BROTHER INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 18/168,919

(22) Filed: Feb. 14, 2023

(51) Int. Cl.

| | |
|---|---|
| ***F21V 13/04*** | (2006.01) |
| ***F21S 41/25*** | (2018.01) |
| ***F21S 41/143*** | (2018.01) |
| ***F21S 41/39*** | (2018.01) |
| ***F21S 41/32*** | (2018.01) |

(52) U.S. Cl.
CPC ............. *F21S 41/25* (2018.01); *F21S 41/143* (2018.01); *F21S 41/32* (2018.01); *F21S 41/39* (2018.01)

(58) Field of Classification Search
CPC ........ F21S 43/195; F21S 45/00; F21S 41/321; F21S 41/30; F21S 41/322; F21S 41/33; F21S 41/338; F21S 41/337; F21S 41/25; F21S 41/29; F21S 41/295; F21S 43/00; F21S 43/10; F21S 43/13; F21S 43/14; F21S 43/19
See application file for complete search history.

(56) References Cited

U.S. PATENT DOCUMENTS

| | | | | |
|---|---|---|---|---|
| 6,755,556 | B2 * | 6/2004 | Gasquet | F21S 43/315 362/337 |
| 8,591,083 | B2 * | 11/2013 | Koizumi | F21V 5/04 362/520 |
| 2018/0119899 | A1 * | 5/2018 | Gromfeld | F21K 9/69 |
| 2019/0360664 | A1 * | 11/2019 | Liu | F21V 7/048 |

* cited by examiner

*Primary Examiner* — Elmito Breval
(74) *Attorney, Agent, or Firm* — MUNCY, GEISSLER, OLDS & LOWE, PC

(57) ABSTRACT

An adaptive headlamp device includes a light emitting unit capable of emitting light rays, and a lens located in front of the light emitting unit. The lens includes an light-emergent surface that is located at a front end thereof, a rear end that defines a light-incident opening, a light-incident surface that defines a light-incident space facing the light emitting unit and communicating with the light-incident opening, and a light-reflecting surface that surrounds the light-incident surface. The light-reflecting surface includes first and second surface portions respectively located at upper and lower sides of the light-incident surface, third and fourth surface portions respectively located at left and right sides of the light-incident surface, and a plurality of interconnecting surface portions. Each interconnecting surface portion interconnects two adjacent ones of the first, second, third, and fourth surface portions. Each of the first, second, third, and fourth surface portions is unsmooth.

10 Claims, 14 Drawing Sheets

ADAPTIVE HEADLAMP DEVICE

FIELD

This disclosure relates to a headlamp device of a vehicle, and more particularly to an adaptive headlamp device.

BACKGROUND

Referring to FIGS. 1 and 2, a conventional adaptive headlamp device mounted to a motorcycle includes a plurality of headlamp units 1 that are arranged in a left-right direction. Each of the headlamp units 1 includes an optical lens 11 and a light emitting subunit 12 disposed behind the optical lens 11.

The optical lenses 11 of the headlamp units 1 are integrally connected in the left-right direction. A length of each of the optical lenses 11 in a front-rear direction is greater than a length of each of the optical lenses 11 in the left-right direction. Each of the optical lenses 11 has a light-emergent surface 111 that is located at a frontmost side thereof and that extends in a specific manner.

The light emitting subunits 12 have different inclinations that respectively cooperate with the light-emergent surfaces 111 so that when the motorcycle is inclined, the conventional adaptive headlamp device may light up a dark area (R1) (see FIG. 2) that a main headlamp device (not shown) of the motorcycle cannot illuminate due to inclination of the motorcycle.

Although the conventional adaptive headlamp device may illuminate the dark area (R1), it is necessary to provide a greater selection of adaptive headlamp devices with different structures to the automotive industry.

SUMMARY

Therefore, an object of the disclosure is to provide an adaptive headlamp device that has a configuration which is different from the abovementioned prior art.

According to the disclosure, the adaptive headlamp device includes a light emitting unit and a lens. The light emitting unit is capable of emitting light rays forwardly. The lens is located in front of the light emitting unit, and includes a light-emergent surface, a rear end, a light-incident surface, and a light-reflecting surface. The light-emergent surface is located at a front end of the lens. The rear end defines a light-incident opening. The light-incident surface is recessed from the rear end, and defines a light-incident space that faces the light emitting unit and that communicates with the light-incident opening such that the light rays emitted by the light emitting unit enter the light-incident space through the light-incident opening. The light-reflecting surface extends forwardly from the rear end and surrounds the light-incident surface. When the light rays emitted by the light emitting unit encounter the light-reflecting surface, the light rays reflect off the light-reflecting surface and travel to the light-emergent surface. The light-reflecting surface includes a first surface portion, a second surface portion, a third surface portion, a fourth surface portion, and a plurality of interconnecting surface portions. The first and second surface portions extend forwardly from the rear end and are respectively located at upper and lower sides of the light-incident surface. The third and fourth surface portions extend forwardly from the rear end and are respectively located at left and right sides of the light-incident surface. The interconnecting surface portions are separated from each other. Each of the interconnecting surface portions interconnects two adjacent ones of the first, second, third, and fourth surface portions. Each of the first, second, third, and fourth surface portions is unsmooth.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
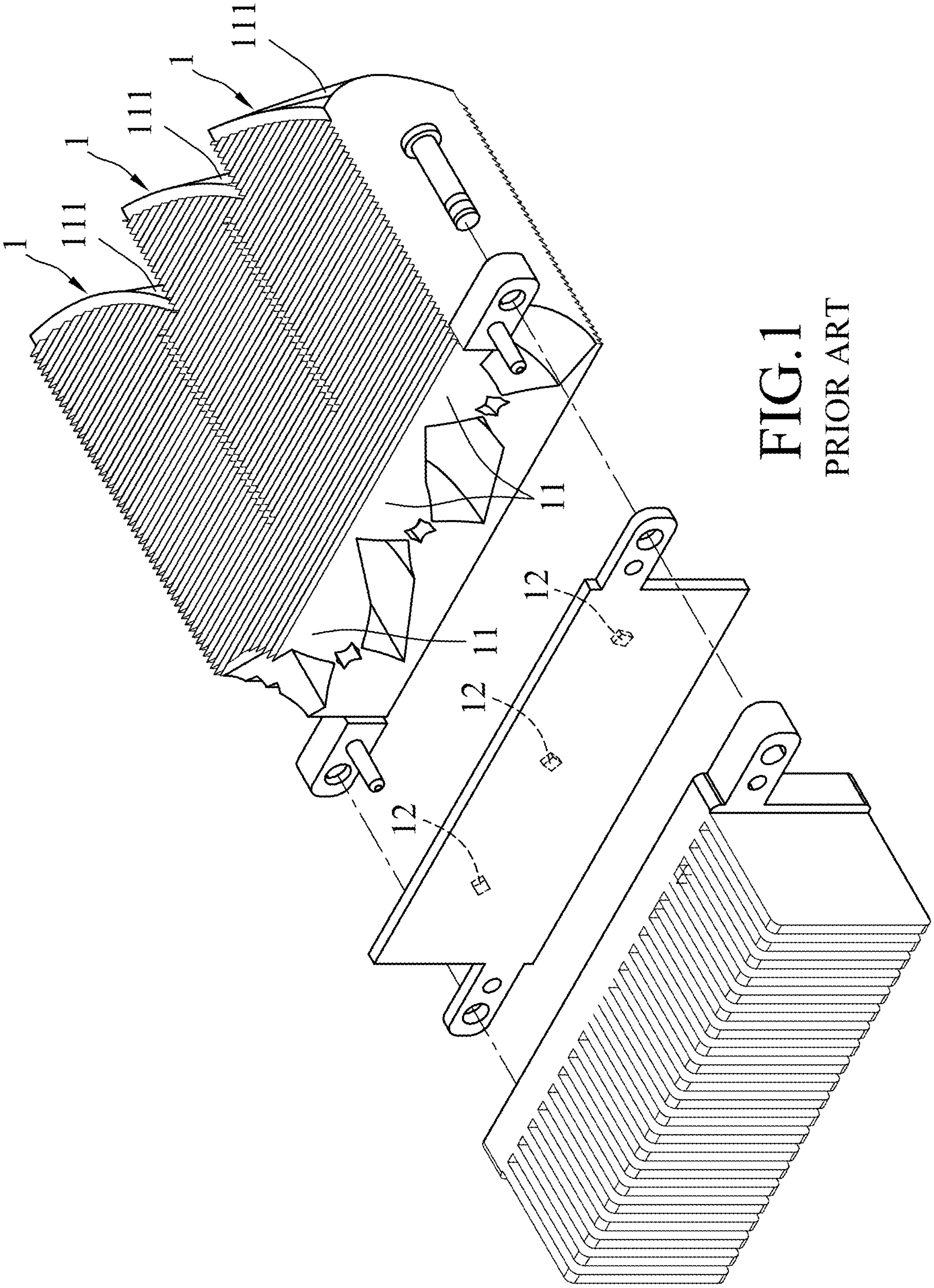
FIG.1 PRIOR ART
FIG. 1 is a perspective view of a conventional adaptive headlamp device of a motorcycle.
Figure 2:
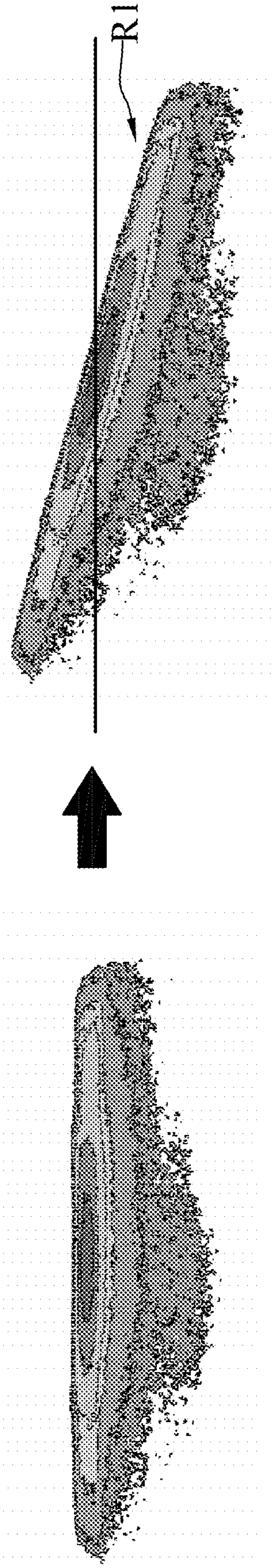
FIG.2 PRIOR ART
FIG. 2 is a schematic view illustrating a change in light distribution of a main headlamp device of the motorcycle due to inclination of the motorcycle.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
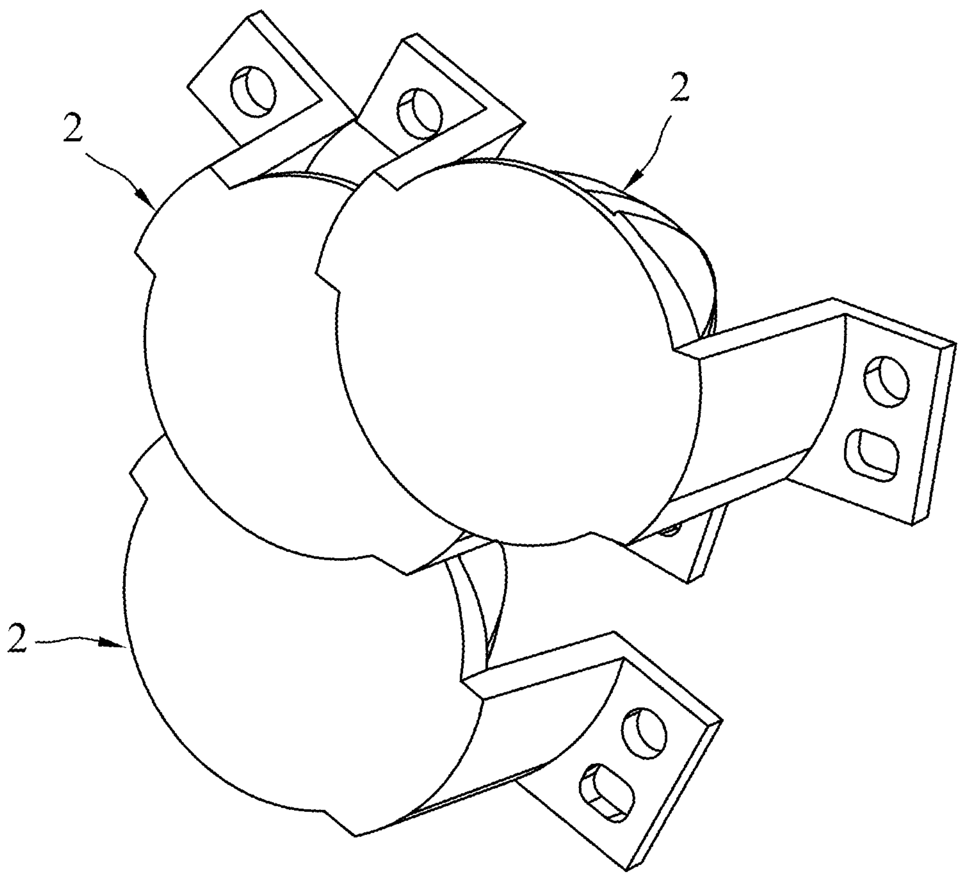
FIG. 3 is a perspective view of three embodiments of adaptive headlamp devices according to the disclosure.
Figure 4:
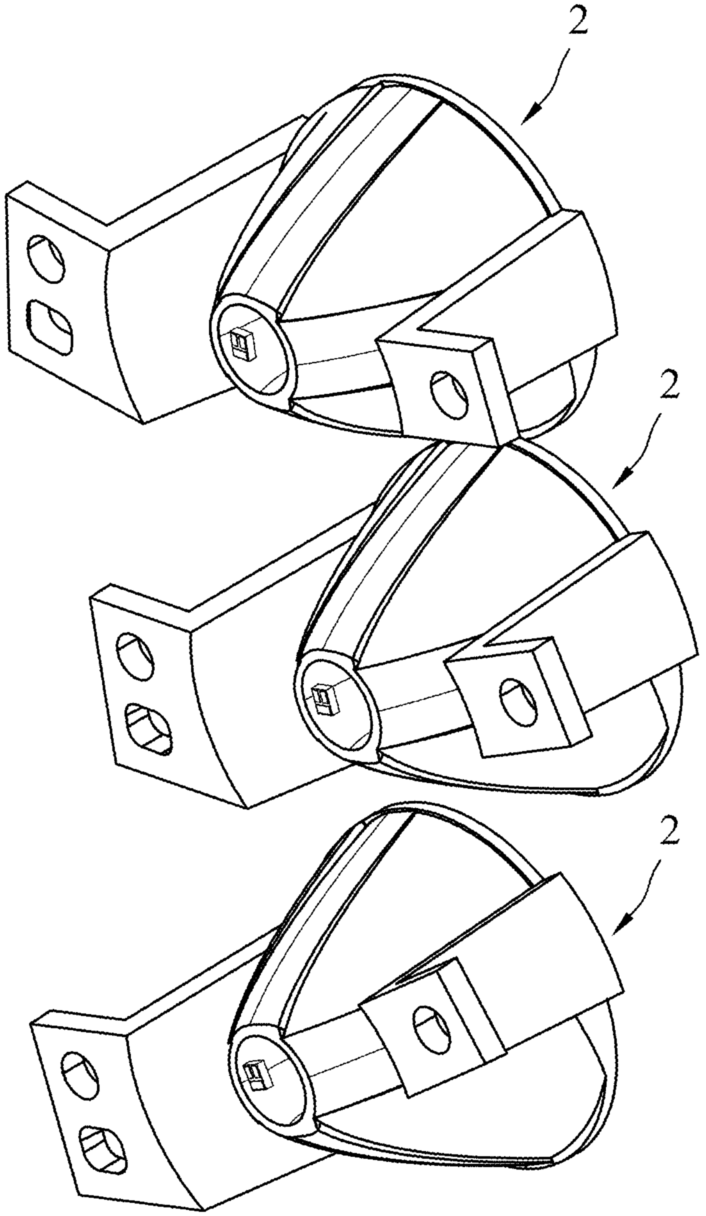
FIG. 4 is another perspective view of the embodiments.
Figure 5:
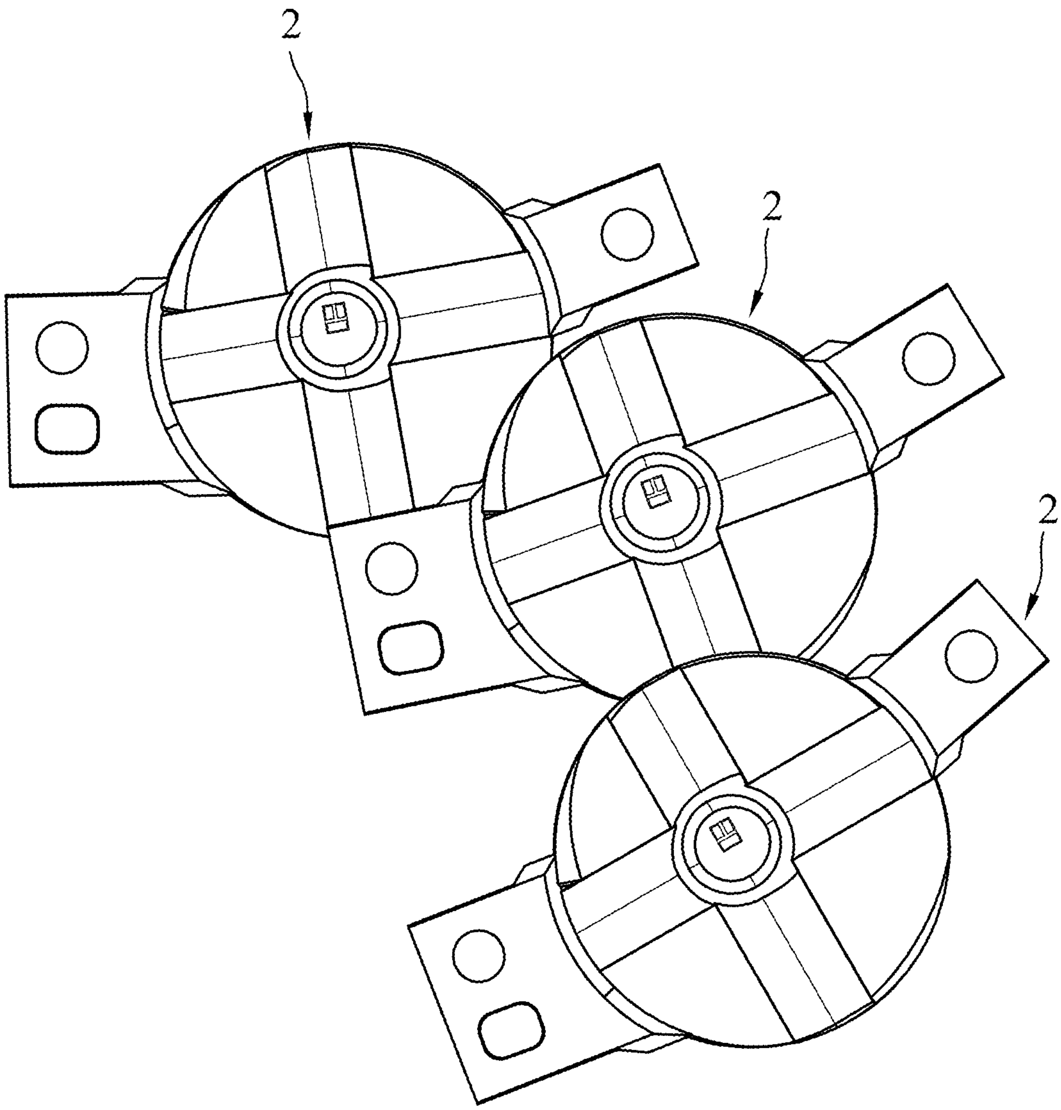
FIG. 5 is a rear view of the embodiments.
Figure 6:
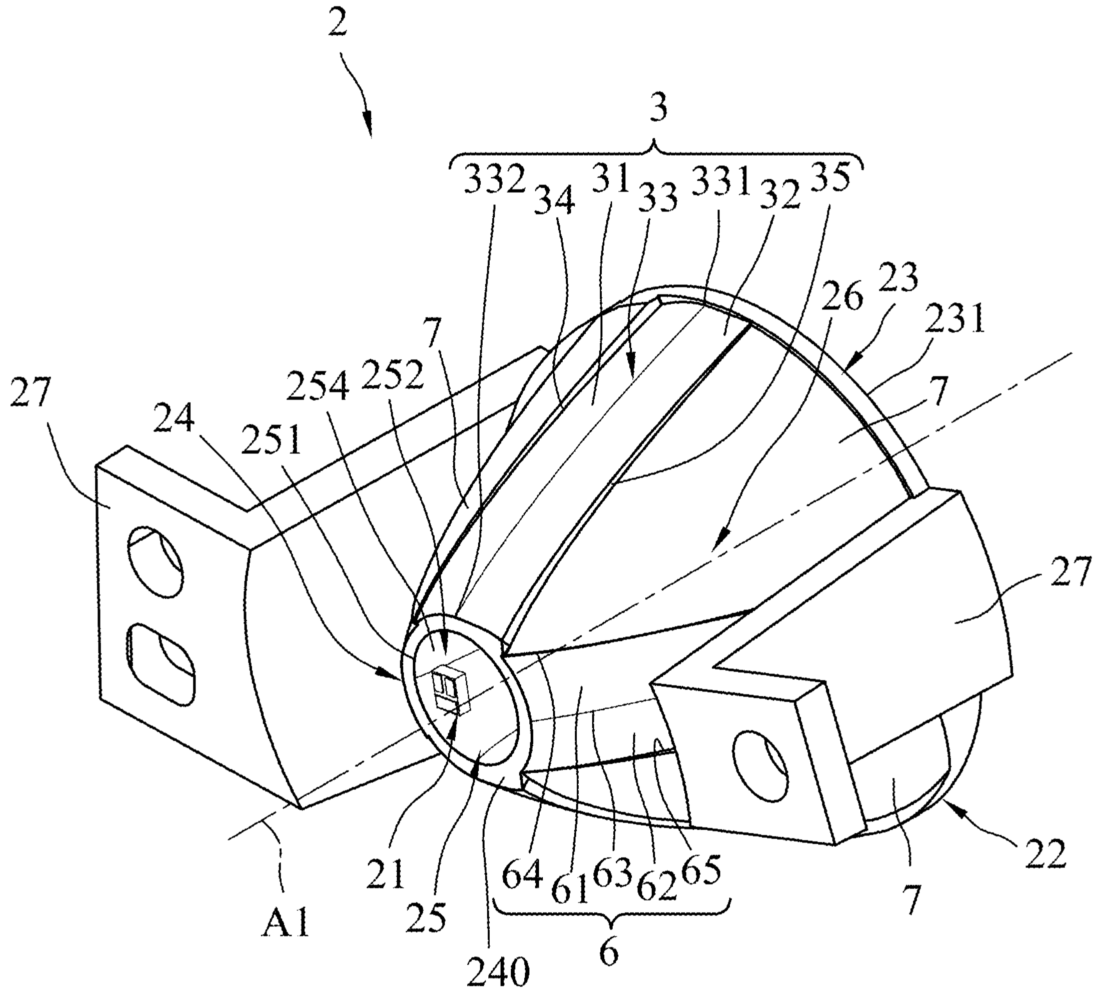
FIG. 6 is a perspective view of one of the embodiments.

Referring to FIGS. 3 to 5, an embodiment of an adaptive headlamp device 2 according to the disclosure is adapted to be mounted to a motorcycle (not shown), and the motorcycle may be provided with an adaptive headlamp set that includes a plurality of adaptive headlamp devices 2. Since the structure of each of the adaptive headlamp devices 2 in the adaptive headlamp set is the same, and since each of the adaptive headlamp devices 2 is only different in its angle of inclination relative to the motorcycle for illuminating in different directions, only the topmost adaptive headlamp device 2 will hereafter be elaborated.

Referring to FIGS. 6 to 9, the adaptive headlamp device 2 includes a light emitting unit 21, and a lens 22 that is located in front of the light emitting unit 21. The adaptive headlamp device 2 may further include a mounting unit 27 through which the adaptive headlamp device 2 is mounted to the motorcycle. Since the structure of the mounting unit 27 is widely-understood by those skilled in the art and does not fall within the scope of the disclosure, a detailed description thereof is omitted, and illustration thereof is omitted in FIGS. 7 to 9.

The light emitting unit 21 includes an LED chip, and a light emitting source 211 that is capable of emitting light rays forwardly toward the lens 22. Since generating light rays via the LED chip is widely-understood by those skilled in the art, a detailed description of the light emitting unit 21 is omitted.

The lens 22 has a central axis (A1) that extends in a direction perpendicular to a radial direction (D1) (see FIGS. 8 and 9) of the lens 22, and a front lens portion 23 and a rear lens portion 24 that are integrally connected in a front-rear direction.

The front lens portion 23 is substantially configured to be disc-shaped, and has a light-emergent surface 231 that is located at a front end thereof and that is configured to be planar.

The rear lens portion 24 has a rear end 240, a light-incident surface 25, and a light-reflecting surface 26. The rear end 240 defines a light-incident opening 251. The light-incident surface 25 is recessed forwardly from the rear end 240, and defines a light-incident space 252 that faces the light emitting unit 21 and that communicates with the light-incident opening 251 such that the light rays emitted by the light emitting unit 21 enter the light-incident space 252 through the light-incident opening 251. The light-reflecting surface 26 extends forwardly from the rear end 240 to the front lens portion 23, and surrounds the light-incident surface 25 about the central axis (A1).

The light-incident surface 25 has a main surface portion 253 that is spaced apart from and located in front of the light-incident opening 251, and an annular surface portion 254 that interconnects a periphery of the light-incident opening 251 and a periphery of the main surface portion 253.

The main surface portion 253 is configured to be a curved surface of a plano-convex lens that has a focal point coinciding with the light emitting source 211 of the light emitting unit 21. As a result, the light rays emitted by the light emitting unit 21 will become parallel to each other after being refracted by the main surface portion 253. The annular surface portion 254 surrounds the light-incident opening 251, and cooperates with the main surface portion 253 to define the light-incident space 252.

When the light rays emitted by the light emitting surface 2 encounter the light-reflecting surface 26, the light rays reflect off and travel to the light-emergent surface 231. The light-reflecting surface 26 includes a first surface portion 3 and a second surface portion 4 that extend forwardly from the rear end 240 and that are respectively located at upper and lower sides of the light-incident surface 25, a third surface portion 5 and a fourth surface portion 6 that extend forwardly from the rear end 240 and that are respectively located at left and right sides of the light-incident surface 25, and a plurality of interconnecting surface portions 7 that are separated from each other. Each of the interconnecting surface portions 7 interconnects two adjacent one of the first, second, third, and fourth surface portions 3, 4, 5, 6. Each of the first, second, third, and fourth surface portions 3, 4, 5, 6 is unsmooth.

Referring to FIGS. 7 to 9 again, the first surface portion 3 includes a left surface section 31 and a right surface section 32 that are arranged in a left-right direction, a partition 33 that is between the left and right surface sections 31, 32, a left interconnecting surface section 34 that is located at a leftmost side of the left surface section 31 opposite to the partition 33 and that interconnects the left surface section 31 and the interconnecting surface portion 7 adjacent thereto, and a right interconnecting surface section 35 that is located at a rightmost side of the right surface section 32 opposite to the partition 33 and that interconnects the right surface section 32 and the interconnecting surface portion 7 adjacent thereto.

Figure 8:
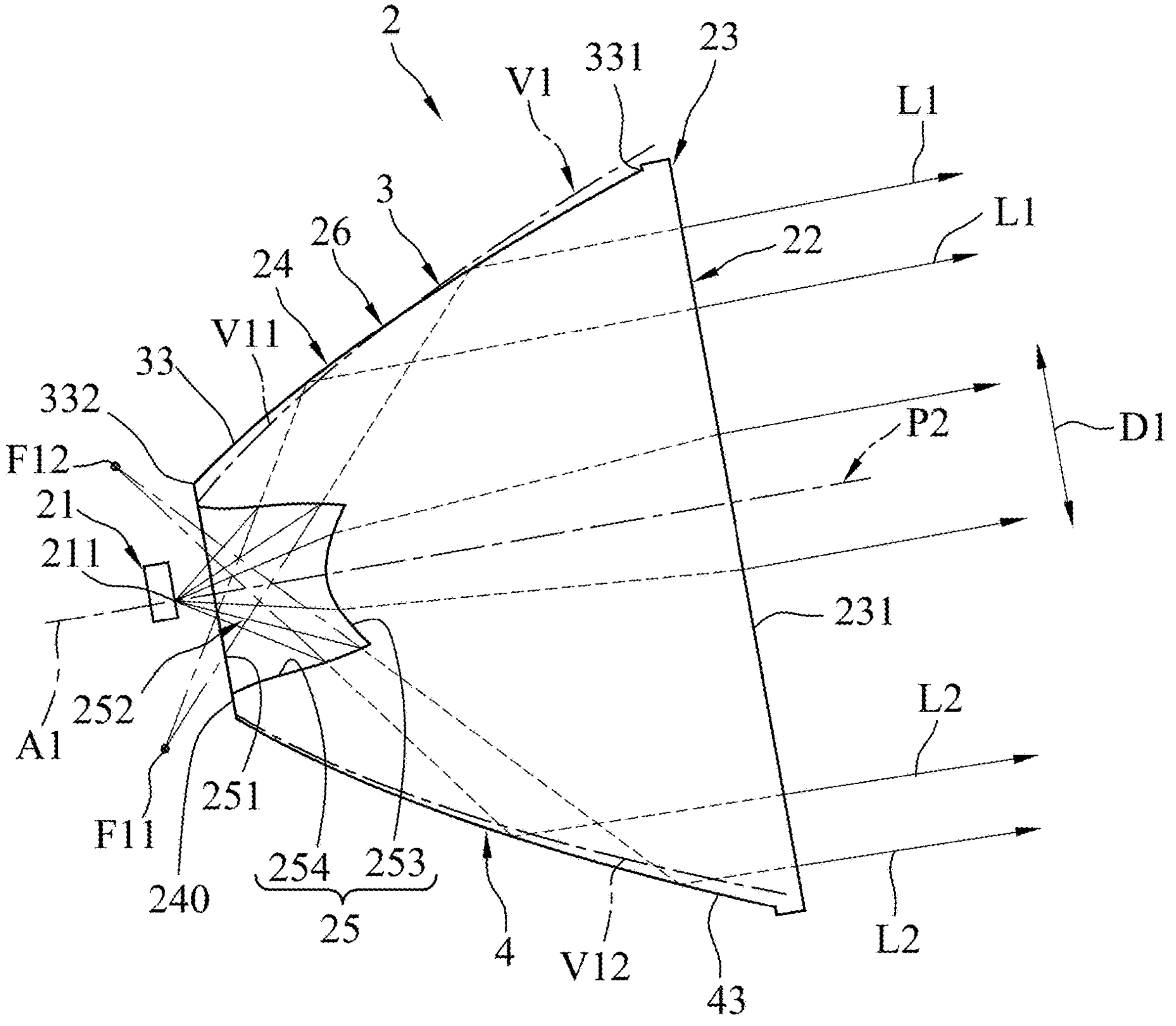
FIG. 8 is a sectional view taken along line VIII-VIII in FIG. 7.

Some of the light rays that are emitted by the light emitting unit 21 and that travel through the annular surface portion 254 of the light-incident surface encounter the partition 33 of the first surface portion 3 of the light-reflecting surface 26, and are defined as first light rays (L1) (see FIG. 8). The partition 33 has a front end point 331 that is connected to the front lens portion 23, and a rear end point 332 that is connected to the rear end 240. A junction of the left interconnecting surface section 34 and the left surface portion 31 is at an angle so that the left surface portion 31 is offset from the interconnecting surface portion 7 adjacent thereto (see FIG. 6). A junction of the right interconnecting surface section 35 and the right surface portion 32 is at an angle so that the right surface portion 32 is offset from the interconnecting surface portion 7 adjacent thereto (see FIG. 6).

The second surface portion 4 includes a left surface section 41 and a right surface section 42 that are arranged in the left-right direction, a partition 43 that is between the left and right surface sections 41, 42, a left interconnecting surface section 44 that is located at a leftmost side of the left surface section 41 opposite to the partition 43 and that interconnects the left surface section 41 and the interconnecting surface portion 7 adjacent thereto, and a right interconnecting surface section 45 that is located at a rightmost side of the right surface section 42 opposite to the partition 43 and that interconnects the right surface section 42 and the interconnecting surface portion 7 adjacent thereto.

Some of the light rays that are emitted by the light emitting unit 21 and that travel through the annular surface portion 254 of the light-incident surface encounter the partition 43 of the second surface portion 4 of the light-reflecting surface 26, and are defined as second light rays (L2) (see FIG. 8). A junction of the left interconnecting surface section 44 and the left surface section 41 is at an angle so that the left surface section 41 is offset from the interconnecting surface portion 7 adjacent thereto. A junction of the right interconnecting surface section 45 and the right surface section 42 is at an angle so that the left surface section 42 is offset from the interconnecting surface portion 7 adjacent thereto. Since the offset structures among the first, second, third, fourth, and interconnecting surface portions 3, 4, 5, 6, 7 are similar, only the offset structures among the first surface portion 3 and the adjacent interconnecting surface portions 7 are clearly shown in the Figs.

The third surface portion 5 includes an upper section 51 and a lower section 52 that are arranged in an up-down direction, a partition 53 that is between the upper and lower sections 51, 52, an upper interconnecting surface section 54 that is located at a topmost side of the upper surface section 51 opposite to the partition 53 and that interconnects the upper surface section 51 and the interconnecting surface portion 7 adjacent thereto, and a lower interconnecting surface section 55 that is located at a bottommost side of the lower surface section 52 opposite to the partition 53 and that interconnects the lower surface section 52 and the interconnecting surface portion 7 adjacent thereto.

Figure 9:
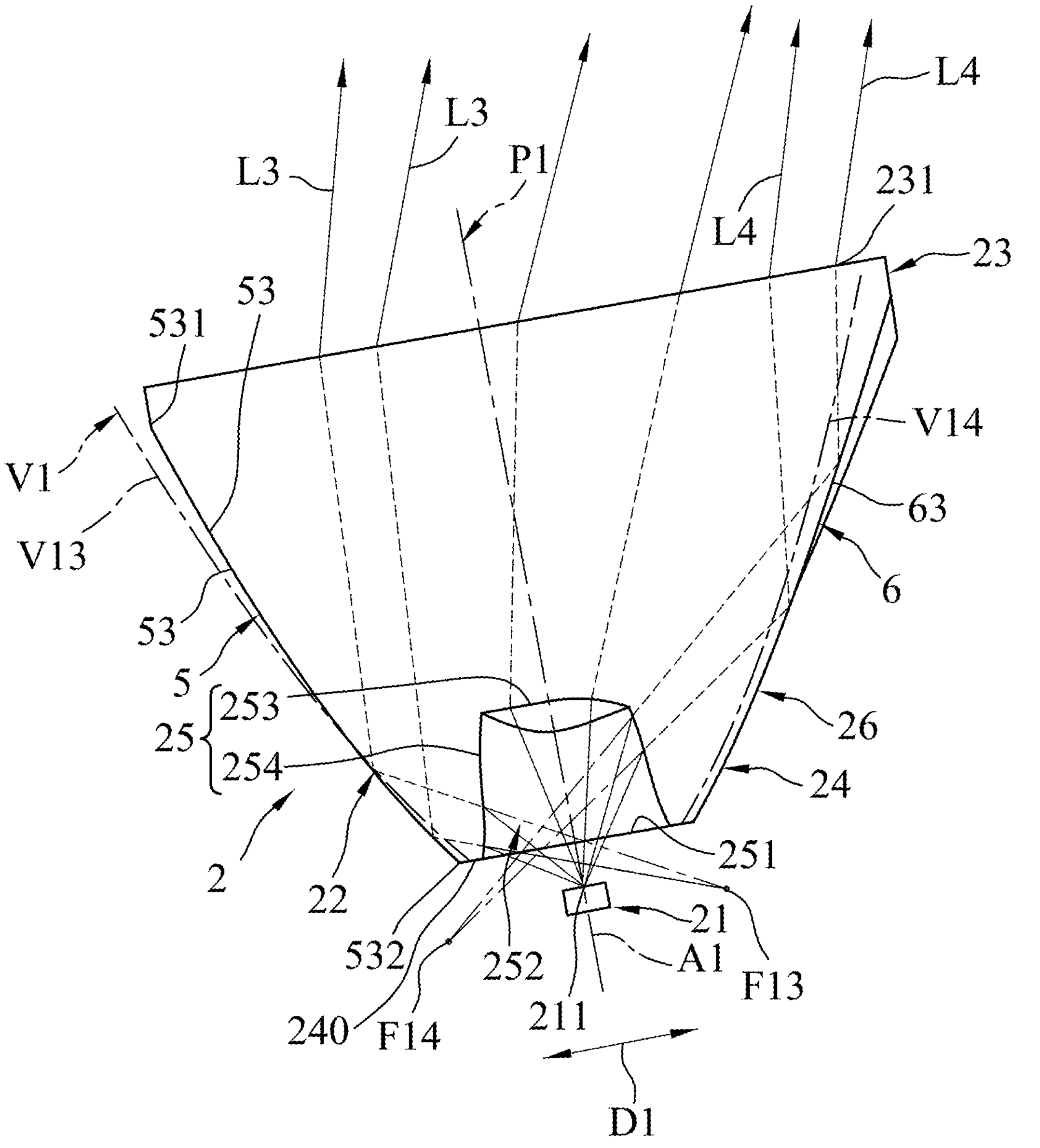
FIG. 9 is a sectional view taken along line IX-IX in FIG. 7.

Some of the light rays that are emitted by the light emitting unit 21 and that travel through the annular surface portion 254 of the light-incident surface encounter the partition 53 of the third surface portion 5 of the light-reflecting surface 26, and are defined as third light rays (L3) (see FIG. 9). The partition 53 has a front end point 531 and a rear end point 532. A junction of the upper interconnecting surface section 54 and the upper surface section 51 is at an angle so that the upper surface section 51 is offset from the interconnecting surface portion 7 adjacent thereto. A junction of the lower interconnecting surface section and the lower surface section 52 is at an angle so that the lower surface section 52 is offset from the interconnecting surface portion 7 adjacent thereto.

The fourth surface portion 6 includes an upper surface section 61 and a lower surface section 62 that are arranged in the up-down direction, a partition 63 that is between the upper and lower surface sections 61, 62, an upper interconnecting surface section 64 that is located at a topmost side of the upper surface section 61 opposite to the partition 63 and that interconnects the upper surface section 61 and the interconnecting surface portion 7 adjacent thereto, and a lower interconnecting surface section 65 that is located at a bottommost side of the lower surface section 62 opposite to the partition 63 and that interconnects the lower surface section 62 and the interconnecting surface portion 7 adjacent thereto.

Some of the light rays that are emitted by the light emitting unit 21 and that travel through the annular surface portion 254 of the light-incident surface encounter the partition 63 of the fourth surface portion 6 of the light-reflecting surface 26, and are defined as fourth light rays (L4). A junction of the upper interconnecting surface section 64 and the upper surface section 61 is at an angle so that the upper surface section 61 is offset from the interconnecting surface portion 7 adjacent thereto. A junction of the lower interconnecting surface section 65 and the lower surface section 62 is at an angle so that the lower surface section 62 is offset from the interconnecting surface portion 7 adjacent thereto.

The partition 33 of the first surface portion 3 and the partition 43 of the second surface portion 4 cooperatively define a first imaginary plane (P1). The partition 53 of the third surface portion 5 and the partition 63 of the fourth surface portion 6 cooperatively define a second imaginary plane (P2). Line VIII-VIII and line IX-IX in FIG. 7 respectively lie on the first and second imaginary planes (P1, P2). As shown in FIG. 8, the central axis (A1) lies on the second imaginary plane (P2).

Referring to FIG. 7 again, the main surface portion 253 is asymmetrical with respect to the first imaginary plane (P1). The left surface section 31 and the right surface section 32 are asymmetrical with respect to the first imaginary plane (P1). The left surface section 41 and the right surface section 42 are asymmetrical with respect to the first imaginary plane (P1). The upper surface section 51 and the lower surface section 52 are asymmetrical with respect to the second imaginary plane (P2). The upper surface section 61 and the lower surface section 62 are asymmetrical with respect to the second imaginary plane (P2).

The lens 22 defines an imaginary parabola (V11) that has an imaginary focal point (F11), an imaginary parabola (V12) that has an imaginary focal point (F12), an imaginary parabola (V13) that has an imaginary focal point (F13), and an imaginary parabola (V14) that has an imaginary focal point (F14). For clarity purposes, the imaginary parabola (V11), the imaginary parabola (V12), the imaginary parabola (V13), and the imaginary parabola (V14) will hereinafter be respectively referred to as the first imaginary parabola (V11), the second imaginary parabola (V12), the third imaginary parabola (V13), and the fourth imaginary parabola (V14), while the imaginary focal point (F11), the imaginary focal point (F12), the imaginary focal point (F13), and the imaginary focal point (F14) will hereinafter be respectively referred to as the first imaginary focal point (F11), the second imaginary focal point (F12), the third imaginary focal point (F13), and the fourth imaginary focal point (F14). The first imaginary parabola (V11) and the second imaginary parabola (V12) are respectively located at upper and lower sides of the central axis (A1), and the third imaginary parabola (V13) and the fourth imaginary parabola (V14) are respectively located at left and right sides of the central axis (A1). In this embodiment, the first imaginary parabola (V11), the second imaginary parabola (V12), the third imaginary parabola (V13), and the fourth imaginary parabola (V14) are rotationally symmetric with respect to the central axis (A1).

The first imaginary parabola (V11), the second imaginary parabola (V12), the third imaginary parabola (V13), and the fourth imaginary parabola (V14) cooperatively define an ideal reflecting surface (V1) of the lens 22 that surrounds the central axis (A1) (i.e., the ideal reflecting surface (V1) is formed by rotating any one of the first imaginary parabola (V11), the second imaginary parabola (V12), the third imaginary parabola (V13), and the fourth imaginary parabola (V14) about the central axis (A1)). The first imaginary parabola (V11) and the second imaginary parabola (V12) are intersection curves of the ideal reflecting surface (V1) and the first imaginary plane (P1). The third imaginary parabola (V13) and the fourth imaginary parabola (V14) are intersection curves of the ideal reflecting surface (V1) and the second imaginary plane (P2). Some of the light rays emitted by the light emitting unit 21 that are refracted by the annular surface portion 254 will become parallel to the central axis (A1) after encountering and being refracted by the ideal reflecting surface (V1).

The first imaginary focal point (F11) is spaced apart from the central axis (A1) in the radial direction (D1) of the lens 22. The light emitting source 211 is located in front of the first imaginary focal point (F11). Extensions of the first light rays (L1) that are refracted by the annular surface portion 254 of the light-incident surface 25 intersect at the first imaginary focal point (F11). Therefore, the first light rays (L1) travel in a path similar to a path in which imaginary light rays that are emitted from the first imaginary focal point (F11) and that are reflected by the partition 33 travel.

The second imaginary focal point (F12) is spaced apart from the central axis (A1) in the radial direction (D1) of the lens 22. The light emitting source 211 is located in front of the second imaginary focal point (F12). Extensions of the second light rays (L2) that are refracted by the annular surface portion 254 of the light-incident surface 25 intersect at the second imaginary focal point (F12). Therefore, the second light rays (L2) travel in a path similar to a path in which imaginary light rays that are emitted from the second imaginary focal point (F12) and that are reflected by the partition 43 travel.

The third imaginary focal point (F13) is spaced apart from the central axis (A1) in the radial direction (D1) of the lens 22. The light emitting source 211 is located in front of the third imaginary focal point (F13). Extensions of the third light rays (L3) that are refracted by the annular surface portion 254 of the light-incident surface 25 intersect at the third imaginary focal point (F13). Therefore, the third light rays (L3) travel in a path similar to a path in which imaginary light rays that are emitted from the third imaginary focal point (F13) and that are reflected by the partition 53 travel.

The fourth imaginary focal point (F14) is spaced apart from the central axis (A1) in the radial direction (D1) of the lens 22. The light emitting source 211 is located in front of the fourth imaginary focal point (F14). Extensions of the fourth light rays (L4) that are refracted by the annular surface portion 254 of the light-incident surface 25 intersect at the fourth imaginary focal point (F14). Therefore, the fourth light rays (L4) travel in a path similar to a path in which imaginary light rays that are emitted from the fourth imaginary focal point (F14) and that are reflected by the partition 63 travel.

The front end point 331 of the partition 33 is located between the first imaginary parabola (V11) and the central axis (A1) in the radial direction (D1). The rear end point 332 of the partition 33 is located at one side of the first imaginary parabola (V11) opposite to the central axis (A1) in the radial direction (D1). That is to say, the first imaginary parabola (V11) has an imaginary rear end point that is located between the rear end point 332 and the central axis (A1) in the radial direction (D1).

The second imaginary parabola (V12) is located between the partition 43 and the central axis (A1) in the radial direction (D1).

The front end point 531 of the partition 53 is located between the third imaginary parabola (V13) and the central axis (A1) in the radial direction (D1). The rear end point 532 of the partition 53 is located at one side of the third imaginary parabola (V13) opposite to the central axis (A1) in the radial direction (D1). That is to say, the third imaginary parabola (V13) has an imaginary rear end point that is located between the rear end point 532 and the central axis (A1) in the radial direction (D1).

The fourth imaginary parabola (V14) is located between the partition 63 and the central axis (A1) in the radial direction (D1).

FIGS. 10 to 19 are contour plots that illustrate different light distributions formed by the light rays which exit the embodiment and which are projected to a vertical surface under different circumstances. The vertical surface is kept at a distance of 10 meters in front of the embodiment.

Figure 10:
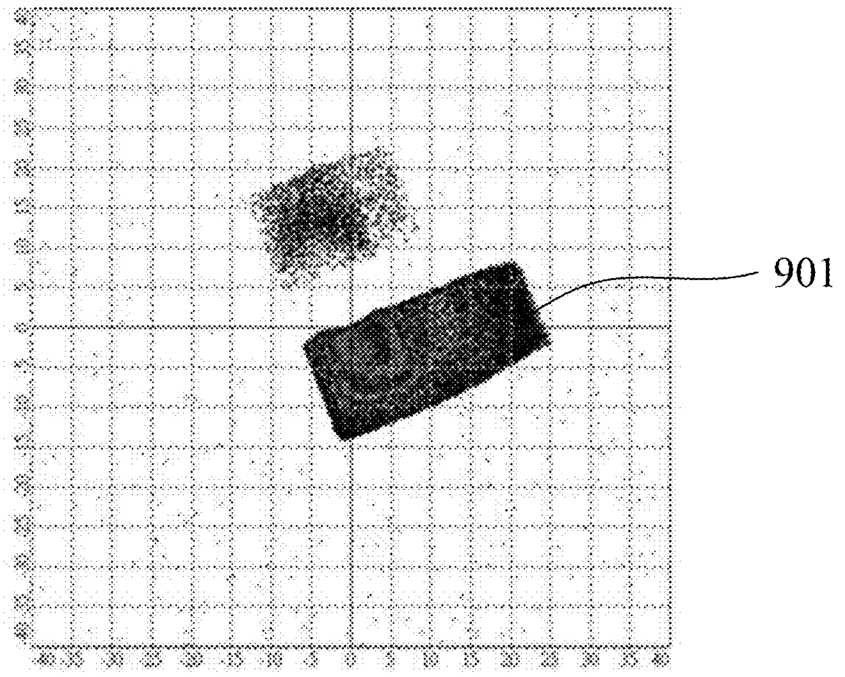
FIG. 10 is a contour plot illustrating light distribution that is formed by light rays travelling through a main surface portion of a light-incident surface of the one of the embodiments.

Referring to FIG. 10, in cooperation with FIGS. 8 and 9, some of the light rays that are emitted by the light emitting unit 21 travel through the main surface portion 253 and exit the light-emergent surface 231 to form a light distribution pattern 901 that is configured to be substantially rectangular. Another distribution pattern that is located higher than the light distribution pattern 901 in FIG. 10 is formed by stray light rays, and thus a detailed description thereof will be omitted.

Figure 11:
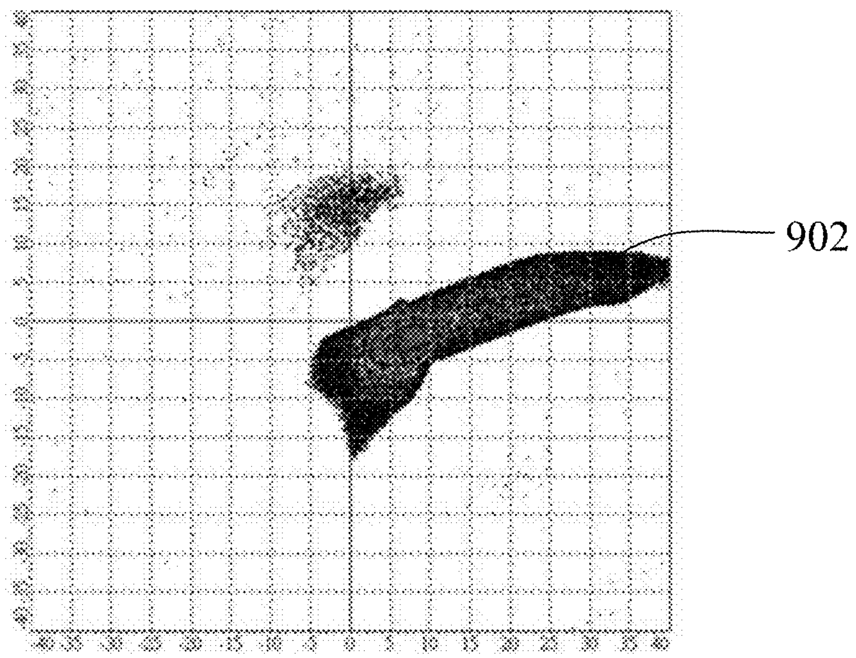
FIG. 11 is a contour plot illustrating light distribution that is formed by light rays reflecting off a first surface portion of a light-reflecting surface of the one of the embodiments.
Figure 12:
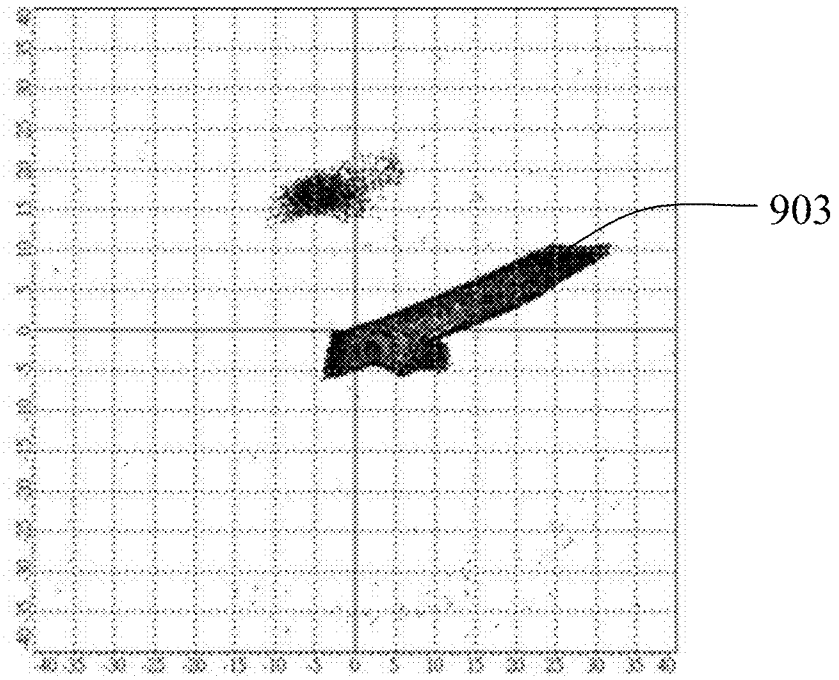
FIG. 12 is a contour plot illustrating light distribution that is formed by light rays reflecting off a second surface portion of the light-reflecting surface.
Figure 13:
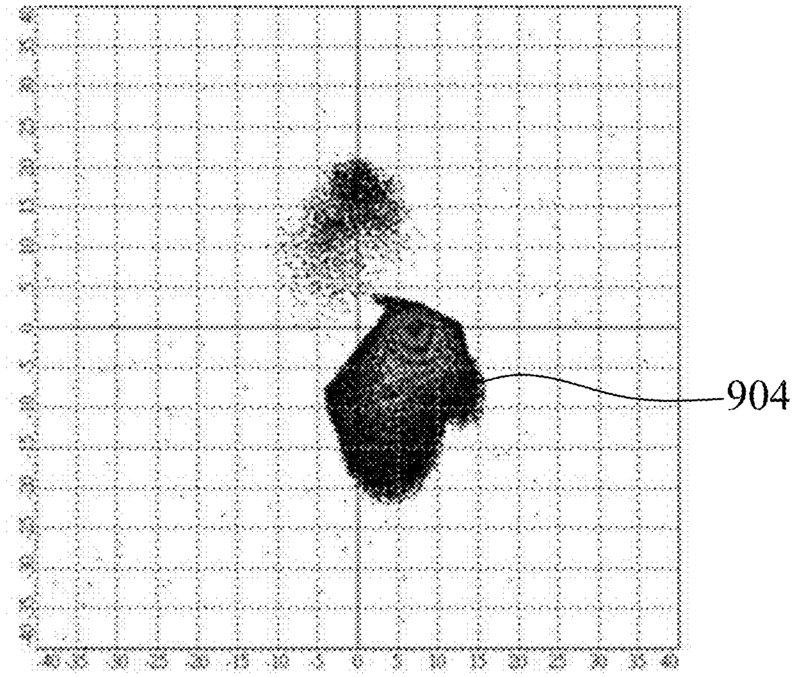
FIG. 13 is a contour plot illustrating light distribution that is formed by light rays reflecting off a third surface portion of the light-reflecting surface.
Figure 14:
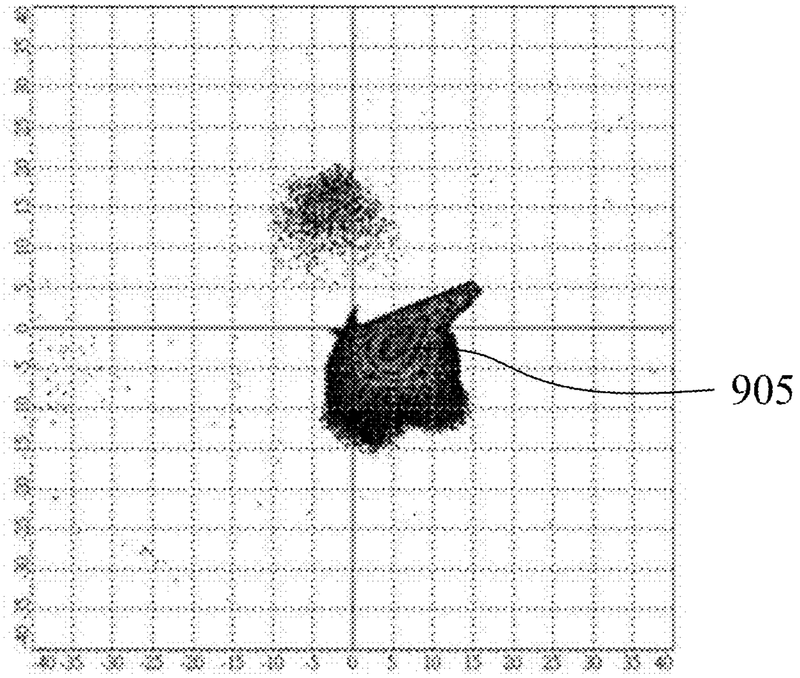
FIG. 14 is a contour plot illustrating light distribution that is formed by light rays reflecting off a fourth surface portion of the light-reflecting surface.

Referring to FIG. 11, in cooperation with FIGS. 8 and 9, some of the light rays that are emitted by the light emitting unit 21 and that travel through the annular surface portion 254 encounter the first surface portion 3, reflect off the first surface portion 3, and exit the light-emergent surface 231 to form a light distribution pattern 902. Another distribution pattern that is located higher than the light distribution pattern 902 in FIG. 11 is formed by stray light rays, and thus a detailed description thereof will be omitted. Referring to FIG. 12, in cooperation with FIGS. 8 and 9, some of the light rays that are emitted by the light emitting unit 21 and that travel through the annular surface portion 254 encounter the second surface portion 4, reflect off the second surface portion 4, and exit the light-emergent surface 231 to form a light distribution pattern 903. Another distribution pattern that is located higher than the light distribution pattern 903 in FIG. 12 is formed by stray light rays, and thus a detailed description thereof will be omitted. Referring to FIG. 13, in cooperation with FIGS. 8 and 9, some of the light rays that are emitted by the light emitting unit 21 and that travel through the annular surface portion 254 encounter the third surface portion 5, reflect off the third surface portion 5, and exit the light-emergent surface 231 to form a light distribution pattern 904. Another distribution pattern that is located higher than the light distribution pattern 904 in FIG. 13 is formed by stray light rays, and thus a detailed description thereof will be omitted. Referring to FIG. 14, in cooperation with FIGS. 8 and 9, some of the light rays that are emitted by the light emitting unit 21 and that travel through the annular surface portion 254 encounter the fourth surface portion 6, reflect off the fourth surface portion 6, and exit the light-emergent surface 231 to form a light distribution pattern 905. Another distribution pattern that is higher than the light distribution pattern 905 in FIG. 14 is formed by stray light rays, and thus a detailed description thereof will be omitted.

Figure 7:
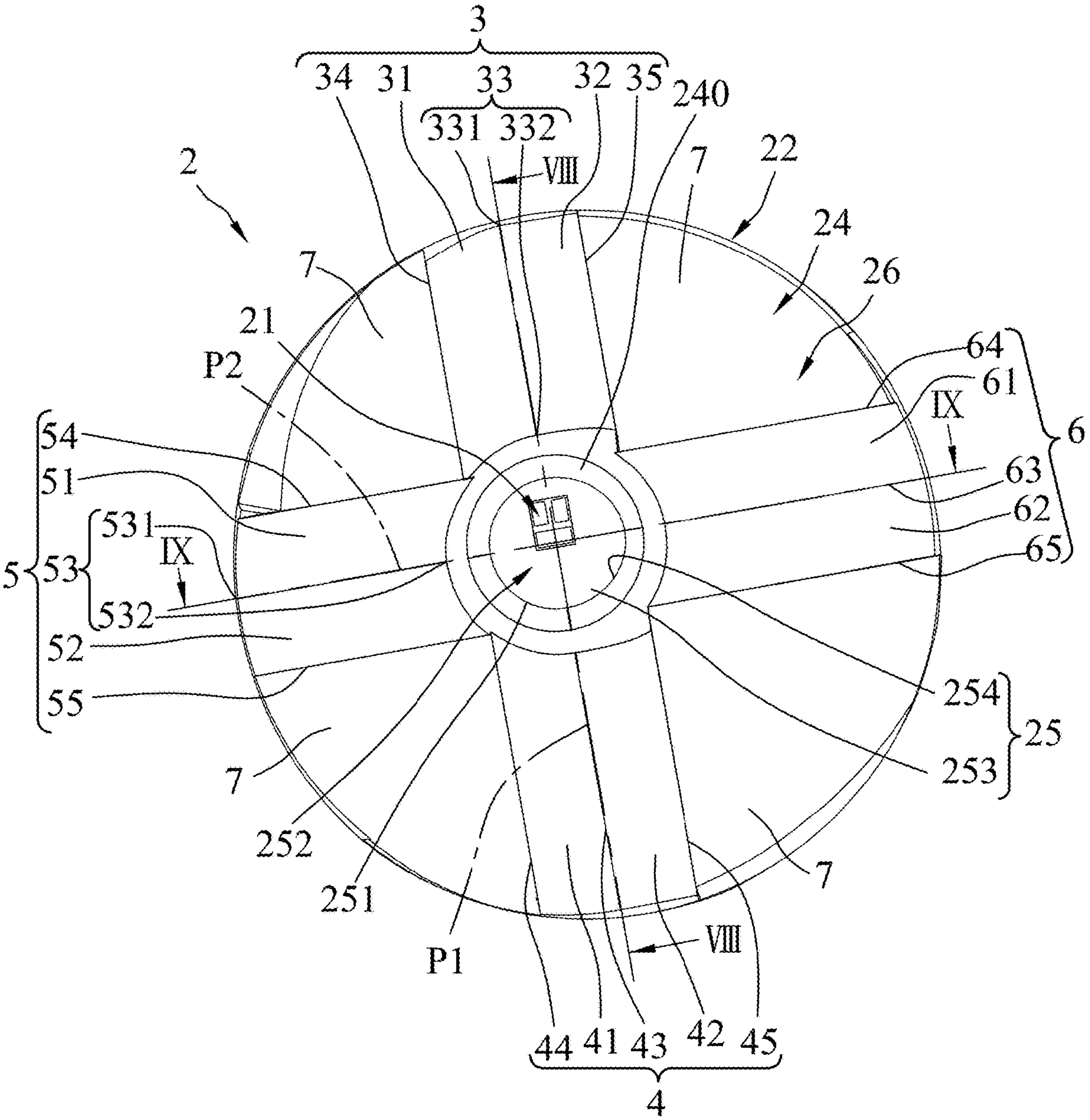
FIG. 7 is a fragmentary rear view of the one of the embodiments.
Figure 15:
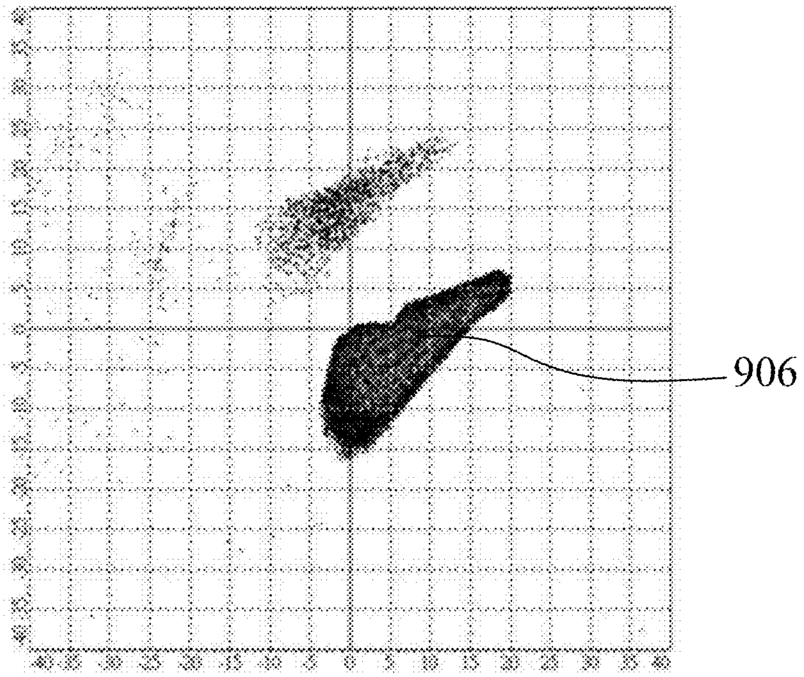
FIG. 15 is a contour plot illustrating light distribution that is formed by light rays reflecting off one of interconnecting surface portions of the light-reflecting surface.
Figure 16:
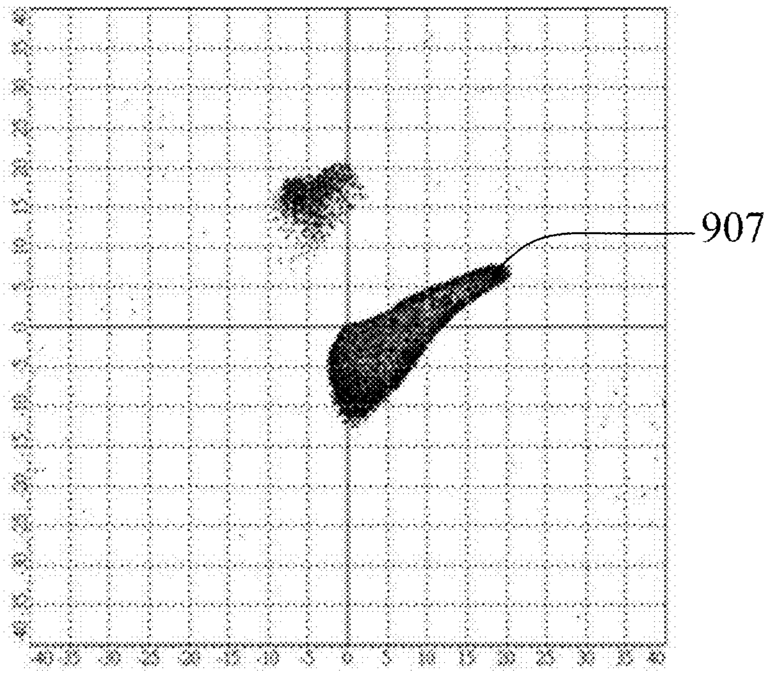
FIG. 16 is a contour plot illustrating light distribution that is formed by light rays reflecting off another one of the interconnecting surface portions.
Figure 17:
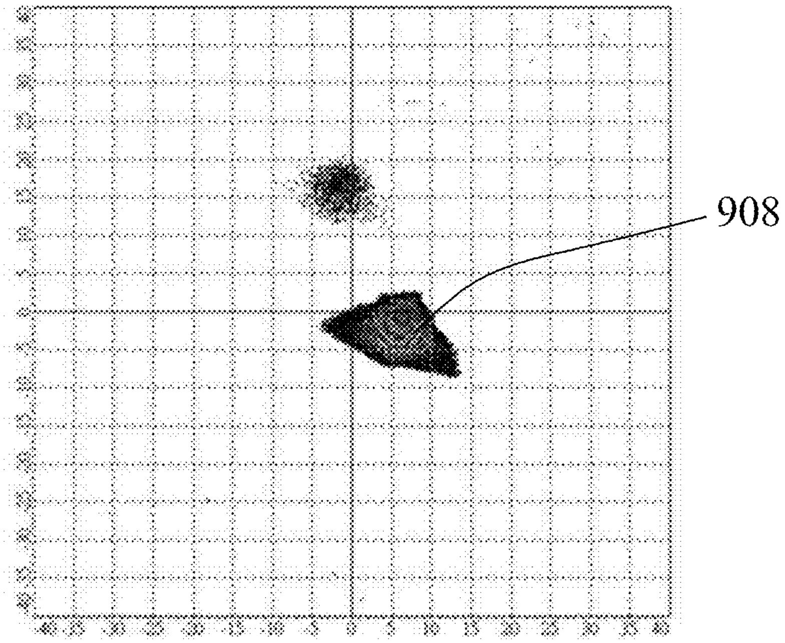
FIG. 17 is a contour plot illustrating light distribution that is formed by light rays reflecting off still another one of the interconnecting surface portions.
Figure 18:
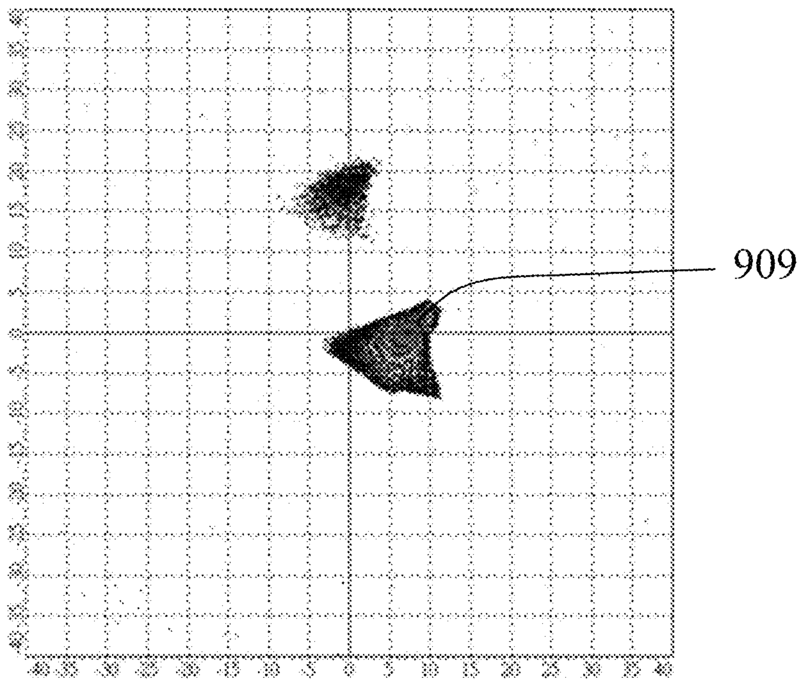
FIG. 18 is a contour plot illustrating light distribution that is formed by light rays reflecting off still another one of the interconnecting surface portions.

Referring to FIG. 15, in cooperation with FIGS. 7 to 9, some of the light rays that are emitted by the light emitting unit 21 and that travel through the annular surface portion 254 encounter the interconnecting surface portion 7 which interconnects the first and third surface portions 3, 5, reflect off the interconnecting surface portion 7 which interconnects the first and third surface portions 3, 5, and exit the light-emergent surface 231 to form a light distribution pattern 906. Another distribution pattern that is located higher than the light distribution pattern 906 in FIG. 15 is formed by stray light rays, and thus a detailed description thereof will be omitted. Referring to FIG. 16, in cooperation with FIGS. 7 to 9, some of the light rays that are emitted by the light emitting unit 21 and that travel through the annular surface portion 254 encounter the interconnecting surface portion 7 which interconnects the second and fourth surface portions 4, 6, reflect off the interconnecting surface portion 7 which interconnects the second and fourth surface portions 4, 6, and exit the light-emergent surface 231 to form a light distribution pattern 907. Another distribution pattern that is located higher than the light distribution pattern 907 in FIG. 16 is formed by stray light rays, and thus a detailed description thereof will be omitted. Referring to FIG. 17, in cooperation with FIGS. 7 to 9, some of the light rays that are emitted by the light emitting unit 21 and that travel through the annular surface portion 254 encounter the interconnecting surface portion 7 which interconnects the first and fourth surface portions 3, 6, reflect off the interconnecting surface portion 7 which interconnects the first and fourth surface portions 3, 6, and exit the light-emergent surface 231 to form a light distribution pattern 908. Another distribution pattern that is located higher than the light distribution pattern 908 in FIG. 17 is formed by stray light rays, and thus a detailed description thereof will be omitted. Referring to FIG. 18, in cooperation with FIGS. 7 to 9, some of the light rays that are emitted by the light emitting unit 21 and that travel through the annular surface portion 254 encounter the interconnecting surface portion 7 which interconnects the second and third surface portions 4, 5, reflect off the interconnecting surface portion 7 which interconnects the second and third surface portions 4, 5, and exit the light-emergent surface 231 to form a light distribution pattern 909. Another distribution pattern that is located higher than the light distribution pattern 909 in FIG. 18 is formed by stray light rays, and thus a detailed description thereof will be omitted. Each of the light distribution patterns 906, 907, 908, 909 is configured to be substantially triangular. The light distribution patterns 906, 907, 908, 909 are different from each other.

Figure 19:
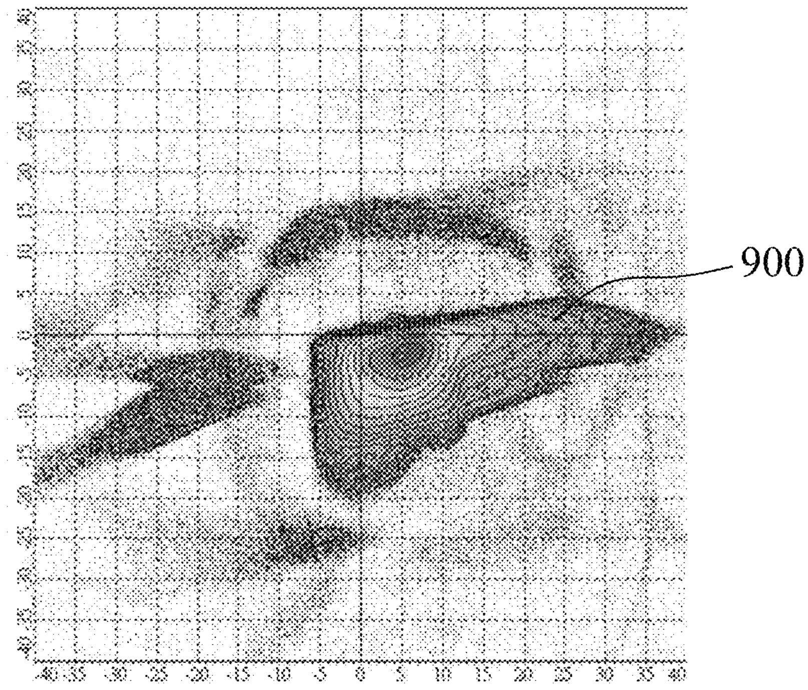
FIG. 19 is a contour plot that is formed by overlapping the light distributions in FIGS. 10 to 18.

FIG. 19 is a contour plot that is formed by overlapping the light distributions in FIGS. 10 to 18. All of the light rays that are emitted by the light emitting unit 21 exit the light-emergent surface 231 to form a light distribution pattern 900 as shown in FIG. 19. Therefore, when the motorcycle is inclined, the adaptive headlamp device 2 may light up a dark area (not shown) that a main headlamp device (not shown) of the motorcycle cannot illuminate due to inclination of the motorcycle.

In summary, by virtue of the light-incident surface 25 defining the light-incident space 252 that faces the light-emitting unit 21, and by virtue of the light-reflecting surface 26 reflecting the light rays, the light rays emitted by the light-emitting unit 21 may be utilized. Via the structure of the light-reflecting surface 26, the adaptive headlamp device 2 provides the light distribution pattern 900 that is a combination of the light distribution patterns 901 to 909. Moreover, the asymmetrical configuration of each of the main surface portion 253, the first, second, third, and fourth surface portions 3, 4, 5, 6 has not been adopted in conventional adaptive headlamp devices, and therefore the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An adaptive headlamp device comprising:

a light emitting unit capable of emitting light rays forwardly; and a lens located in front of the light emitting unit, and having a light-emergent surface that is located at a front end thereof, a rear end that defines a light-incident opening, a light-incident surface that is recessed from the rear end and that defines a light-incident space facing the light emitting unit and communicating with the light-incident opening such that the light rays emitted by the light emitting unit enter the light-incident space through the light-incident opening, and a light-reflecting surface that extends forwardly from the rear end and that surrounds the light-incident surface, when the light rays emitted by the light emitting unit encounter the light-reflecting surface, the light rays reflecting off the light-reflecting surface and traveling to the light-emergent surface, the light-reflecting surface including a first surface portion and a second surface portion that extend forwardly from the rear end and that are respectively located at upper and lower sides of the light-incident surface, a third surface portion and a fourth surface portion that extend forwardly from the rear end and that are respectively located at left and right sides of the light-incident surface, and a plurality of interconnecting surface portions that are separated from each other, each of the interconnecting surface portions interconnecting two adjacent ones of the first, second, third, and fourth surface portions, each of the first, second, third, and fourth surface portions being unsmooth.

2. The adaptive headlamp device as claimed in claim 1, wherein:

the first surface portion includes a left surface section and a right surface section that are arranged in a left-right direction, and a partition between the left and right surface sections;

the second surface portion includes a left surface section and a right surface section that are arranged in the left-right direction, and a partition between the left and right surface sections;

the third surface portion includes an upper surface section and a lower surface section that are arranged in an up-down direction, and a partition between the upper and lower surface sections; and the fourth surface portion includes an upper surface section and a lower surface section that are arranged in the up-down direction, and a partition between the upper and lower surface sections.

3. The adaptive headlamp device as claimed in claim 2, wherein:

the partition of the first surface portion and the partition of the second surface portion cooperatively define a first imaginary plane, the left surface section and the right surface section of the first surface portion being asymmetrical with respect to the first imaginary plane, the left surface section and the right surface section of the second surface portion being asymmetrical with respect to the first imaginary plane; and the partition of the third surface portion and the partition of the fourth surface portion cooperatively define a second imaginary plane, the upper surface section and the lower surface section being asymmetrical with respect to the second imaginary plane, the upper surface section and the lower surface section being asymmetrical with respect to the second imaginary plane.

4. The adaptive headlamp device as claimed in claim 2, wherein the light-incident surface has a main surface portion that is spaced apart from and located in front of the light-incident opening, and an annular surface portion that interconnects a periphery of the light-incident opening and a periphery of the main surface portion, the partition of the first surface portion and the partition of the second surface portion cooperatively defining a first imaginary plane, the main surface portion being asymmetrical with respect to the first imaginary plane.

5. The adaptive headlamp device as claimed in claim 4, wherein some of the light rays that are emitted by the light emitting unit travel through the main surface portion and exit the light-emergent surface to form a light distribution pattern that is configured to be substantially rectangular.

6. The adaptive headlamp device as claimed in claim 2, wherein the lens has a central axis, and defines an imaginary parabola that has a imaginary focal point, imaginary focal point being spaced apart from the central axis in a radial direction of the lens perpendicular to the central axis, the light emitting unit including a light emitting source that is located in front of the imaginary focal point, some of the light rays that are emitted by the light emitting unit and that travel through the light-incident surface encountering the partition of the first surface portion of the light-reflecting surface and being defined as first light rays, extensions of the first light rays that are refracted by the light-incident surface intersecting at the imaginary focal point, the partition of the first surface portion having a front end point that is located between the imaginary parabola and the central axis in the radial direction, and a rear end point that is located at one side of the imaginary parabola opposite to the central axis in the radial direction.

7. The adaptive headlamp device as claimed in claim 2, wherein the lens has a central axis, and defines an imaginary parabola that has a imaginary focal point, the imaginary focal point being spaced apart from the central axis in a radial direction of the lens perpendicular to the central axis, the light emitting unit including a light emitting source that is located in front of the imaginary focal point, some of the light rays that are emitted by the light emitting unit and that travel through the light-incident surface encountering the partition of the second surface portion of the light-reflecting surface and being defined as second light rays, extensions of the second light rays that are refracted by the light-incident surface intersecting at the imaginary focal point, the imaginary parabola being located between the partition of the second surface portion and the central axis in the radial direction.

8. The adaptive headlamp device as claimed in claim 2, wherein the lens has a central axis, and defines an imaginary parabola that has a imaginary focal point, the imaginary focal point being spaced apart from the central axis in a radial direction of the lens perpendicular to the central axis, the light emitting unit including a light emitting source that is located in front of the imaginary focal point, some of the light rays that are emitted by the light emitting unit and that travel through the light-incident surface encountering the partition of the third surface portion of the light-reflecting surface and being defined as third light rays, extensions of the third light rays that are refracted by the light-incident surface intersecting at the imaginary focal point, the partition of the third surface portion having a front end point that is located between the imaginary parabola and the central axis in the radial direction, and a rear end point that is located at one side of the imaginary parabola opposite to the central axis in the radial direction.

9. The adaptive headlamp device as claimed in claim 2, wherein the lens has a central axis, and defines an imaginary parabola that has a imaginary focal point, the imaginary focal point being spaced apart from the central axis in a radial direction of the lens perpendicular to the central axis, the light emitting unit including a light emitting source that is located in front of the imaginary focal point, some of the light rays that are emitted by the light emitting unit and that travel through the light-incident surface encountering the partition of the fourth surface portion of the light-reflecting surface and being defined as fourth light rays, extensions of the fourth light rays that are refracted by the light-incident surface intersecting at the imaginary focal point, the imaginary parabola being located between the partition of the fourth surface portion and the central axis in the radial direction.

10. The adaptive headlamp device as claimed in claim 1, wherein the light rays that are emitted by the light emitting unit, that travel through the light-incident surface and that encounter any one of the interconnecting surface portions reflect off the one of the interconnecting surface portions and exit the light-emergent surface to form a light distribution pattern that is configured to be substantially triangular.

* * * * *